United States Patent [19]

McGaffigan

[11] Patent Number: 5,475,203
[45] Date of Patent: Dec. 12, 1995

[54] METHOD AND WOVEN MESH HEATER COMPRISING INSULATED AND NONINSULATED WIRE FOR FUSION WELDING OF PLASTIC PIECES

[75] Inventor: Thomas McGaffigan, Half Moon Bay, Calif.

[73] Assignee: Gas Research Institute, Chicago, Ill.

[21] Appl. No.: 245,361

[22] Filed: May 18, 1994

[51] Int. Cl.$^6$ .................................................. H05B 3/34
[52] U.S. Cl. ................................... 219/548; 219/545
[58] Field of Search .............................. 219/544, 545, 219/548, 549, 91.2, 91.21, 528, 529; 338/208

[56] References Cited

U.S. PATENT DOCUMENTS

| | | | |
|---|---|---|---|
| 2,065,760 | 12/1936 | Smith | 219/20 |
| 2,458,801 | 1/1949 | Schwartz | 219/16 |
| 2,884,509 | 4/1959 | Heath | 201/63 |
| 2,922,867 | 1/1960 | Crump | 219/545 |
| 2,926,320 | 2/1960 | Anderson | 338/31 |
| 3,001,054 | 9/1961 | Fehner | 219/19 |
| 3,721,799 | 3/1973 | Carlstrom | 219/545 |
| 3,813,520 | 5/1974 | Brouneus | 219/543 |
| 4,256,945 | 3/1981 | Carter et al. | 219/10.75 |
| 4,313,777 | 2/1982 | Buckley et al. | 219/545 |
| 4,914,267 | 4/1990 | Derbyshire | 219/85.1 |
| 4,955,129 | 9/1990 | McCauley et al. | 29/611 |
| 5,125,690 | 6/1992 | Taylor et al. | 285/21 |

FOREIGN PATENT DOCUMENTS

| | | |
|---|---|---|
| 2043001 | 8/1970 | Germany. |
| PCT/US92/01220 | 9/1992 | WIPO. |

*Primary Examiner*—Teresa J. Walberg
*Assistant Examiner*—Sam Paik
*Attorney, Agent, or Firm*—Hopkins & Thomas; Scott A. Horstemeyer

[57] ABSTRACT

A woven mesh heater generates a heat emitting surface which provides for uniform spatial distribution of heat and which is self-regulated in the preferred embodiment. The heater is particularly useful in joining together polyethylene pieces. The heater is produced from woven mesh and inserted between polyethylene pieces to be joined. Upon energization with a power source, the heater heats the polyethylene pieces to a temperature so that the pieces melt and fuse together. The heater is formed from a mesh of interleaved conductive wires and resistive wires. Electrical paths are established through the mesh by spot welding at intersection, or crossover, points of the conductive and resistive wires. The spot welding produces an electrical connection between the conductive and resistive wires at the welds. In this way, equal distance and therefore equal resistance paths are obtained. In addition, the resistive wires preferably have a two-layer laminate structure with an inner core of a high conductivity material, such as copper, and an outer surface layer of a ferromagnetic material having a particular Curie temperature. The foregoing two-layer laminate structure causes the temperature of the resistive wires to reach a peak value, provided that energization remains constant. Hence, the woven mesh heater is self-regulating.

31 Claims, 4 Drawing Sheets

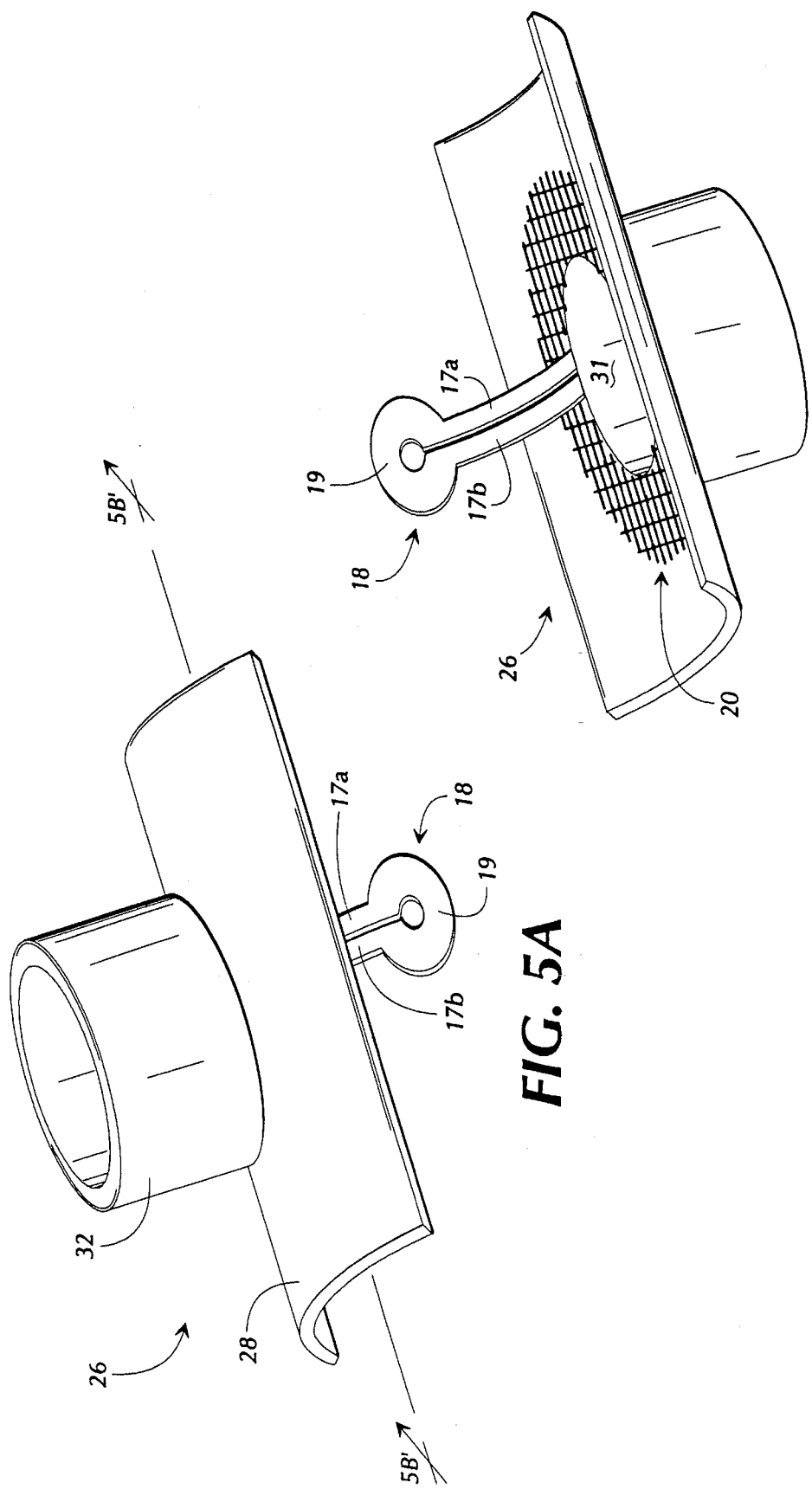

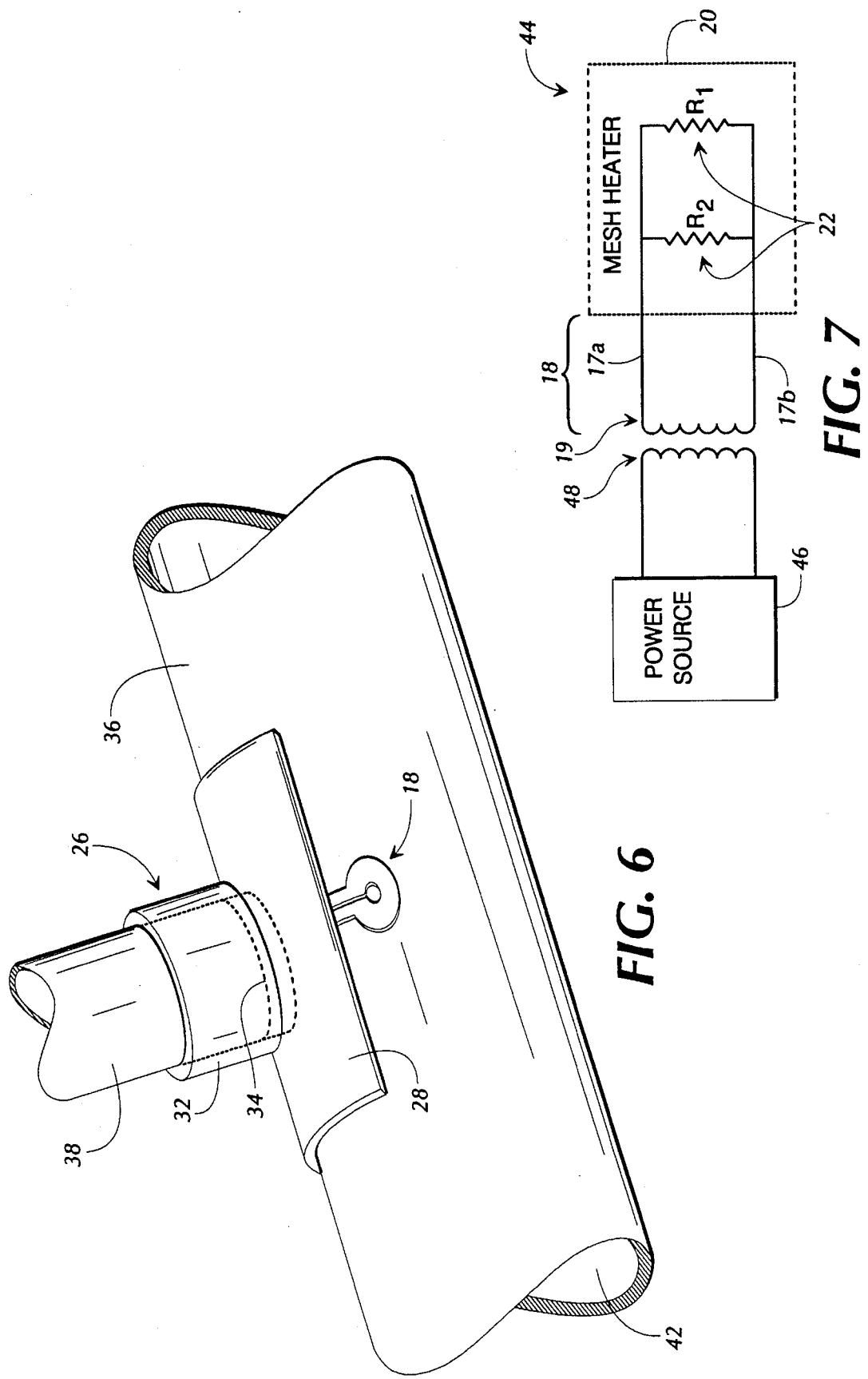

METHOD AND WOVEN MESH HEATER COMPRISING INSULATED AND NONINSULATED WIRE FOR FUSION WELDING OF PLASTIC PIECES

FIELD OF THE INVENTION

The present invention relates generally to heaters for joining together polyethylene materials and, more particularly, to a heater and method for uniformly generating heat across a heat emitting surface and for optimally joining or adhering together polyethylene parts, for example but not limited to, a polyethylene pipe to another polyethylene pipe, saddle, patch, or other structure.

BACKGROUND OF THE INVENTION

In the United States the gas distribution industry is increasingly using polyethylene pipe for gas distribution piping. This trend is due to the reduced installation cost, ease of joining the light-weight pipe, and resistance to corrosion exhibited by polyethylene pipe. One method of joining polyethylene piping is to use mechanical fittings. However, mechanical fittings vary in reliability and are very susceptible to errors by workers. Thus, mechanical fittings are generally undesirable in the gas industry.

Numerous patents have issued over the years on various apparatuses and methods for joining polyethylene pipe. One method, illustrated by U.S. Pat. No. 5,125,690 to Taylor, et al., involves the use of various types of heaters embedded in the inner surface of a sleeve which fits over two pipes to be joined. The pipes are inserted into the sleeve in abutment with each other. Upon heating of the embedded wire heater, the regions of the pipe adjacent the sleeve are softened to the point of fusion and the polyethylene pipes and the sleeve are thereby joined together. Essentially, the same approach is employed for saddles and patches, except for the mechanics of holding the pieces in contact prior to completion of the fusion process.

A recurrent problem with methods for joining polyethylene pipes through fusion welding has been uneven or nonuniform heating of the polyethylene elements to be joined. If the heat is not spread evenly over the parts to be joined, voids and/or weak fused regions result at the juncture between the joined parts. These poorly fused regions are weak in tension, shear, and peel.

Fusion welding methods have been developed in the industry which attempt to more evenly distribute the heat over the polyethylene parts being joined. One previous method, illustrated in international PCT patent WO 2/15182 to Ross et al., utilizes heater wire disposed in various configurations depending on the shape of the polyethylene parts being joined. For example, when a saddle fitting is to be attached to a pipe, the wire is wound in a flat or pancake-like circular, elliptical, or rectangular configuration with radial or cross wires in a central open space so as not to interfere with the communication between the saddle and the main pipe. The importance of the shape employed is to get a large surface area covering of the polyethylene. The wire is a ferromagnetic covered copper or like conductive material, as described in U.S. Pat. No. 4,256,945 to Carter et al. The structure that the wire is formed into and the particular type of wire allow for constant temperature regulation and thus uniform heating throughout the polyethylene parts.

Self-regulating heating elements are also known in the art for helping to distribute heat more uniformly. See, for instance, U.S. Pat. No. 4,256,945 to Carter et al., and U.S. Pat. No. 5,125,690 to Taylor et al. In these self-regulating heating elements, the heater is essentially a wire having an inner core of a non-magnetic material, such as copper, which has high thermal and electrical conductivity, and a surface layer of a ferromagnetic material. Wires with this structure function in a temperature self-regulating manner. When a constant current is applied to the wire, the current is substantially confined to the ferromagnetic surface layer until the temperature of the heating element rises to a particular temperature called the Curie temperature. As this Curie temperature is approached, the current migrates or spreads into the non-magnetic core of the heating element wire. As a result of this migration of the current, the resistance of the heating element declines sharply near the Curie temperature so that the power dissipated by the heating element likewise declines. The Curie temperature of the wire is determined by the characteristics of the ferromagnetic surface layer. U.S. Pat. No. 5,125,690 to Taylor et al. utilizes a self-regulating heater which relies on control of the Curie temperature. The heater is embedded in or wrapped around a sleeve placed around the polyethylene parts to be joined. The heater fuses the polyethylene sleeve to the polyethylene parts, thus joining them.

Furthermore, several heating elements consisting of a conductive mesh are known in the industry. However, none appear to be useful in producing uniform heat for fusing together polyethylene pieces. More specifically, U.S. Pat. No. 2,884,509 to Heath teaches a heating element in which some of the strands are conductors and other interwoven strands are resistors. The conductive strands are formed of some suitable metal. The resistors or insulated strands are formed of glass fibers. The strands may be woven together in any suitable weaving pattern. Conductive strands are interwoven and interlocked with respect to each other and with respect to the insulated strands. U.S. Pat. No. 2,065,760 to Smith also teaches a network of interconnected resisting wires and conducting wires used as an electrical heating device.

Although many of the prior art techniques for joining polyethylene pipes through fusion welding have some merit, these techniques are still not optimum in that they still result in uneven or nonuniform heating of the polyethylene elements to be joined to a certain extent. Thus, fused regions tend to be weak in tension, shear, and peel. Accordingly, a need exists in the industry for a better heater and method for providing heat more uniformly across a heat emitting surface so that polyethylene pieces can be optimally fused together.

SUMMARY OF THE INVENTION

An object of the present invention is to overcome the deficiencies and inadequacies of the prior art as described above and as generally known in the industry.

Another object of the present invention is to provide a heater and method for providing a uniform spatial distribution of heat across a surface area.

Another object of the present invention is to provide a heater for fusion welding of polyethylene parts.

Another object of the present invention is to provide a heater having a wire mesh which exhibits a uniform temperature distribution across the area of the mesh upon energization.

Another object of the present invention is to provide a method for constructing a woven mesh heater which allows for easy customizing of both the spatial heating pattern generated by the mesh heater and the electrical resistance exhibited by the mesh heater.

Another object of the present invention is to provide a method for joining or patching polyethylene members, such as polyethylene pipes and fittings, which method produces strong welds in tension, shear, and peel and which uniformly heats the edges of the pipes being joined causing them to fuse together and form a stable juncture.

Briefly described, the present invention provides for a heater having an optimally uniform heat emitting surface. The heater has a woven mesh with interleaved first and second wires disposed transversely to one another. The first and second wires each can conduct electrical energy. Moreover, the first wires generally have insulation, whereas the second wires do not have insulation.

The insulated first wires and the noninsulated second wires include heat-generating resistive wires for generating heat upon excitation by electrical energy. In the preferred embodiment, the insulated first wires are entirely conductive wires, whereas the noninsulated second wires are entirely resistive wires. However, other configurations are possible and are described herein. Generally, use of conductive wires in the implementations helps to reduce cost, as resistive wires are more expensive but are a necessity. Furthermore, preferably, the resistive wires have a two-layer laminate structure with an inner core of copper and a surface layer of a ferromagnetic material having a particular Curie temperature. This two layer structure helps to regulate the generated heat and insures steady state heat emission, provided that energization remains constant.

One or more electrical paths are created through the mesh by welding together the first and second wires at various crossover points. Each weld penetrates through the insulation of the first wire and bonds the first wire to the adjacent resistive wire to establish an electrical connection therebetween. When more than one path is formed through the mesh, then the paths are in electrical parallel. Moreover, paths can be constructed of approximately equivalent length and/or resistance. Finally, each path has two ends which are connected to opposite electrodes of an energizing portion for receiving electrical energy from a power source. It may be necessary to also cut or otherwise remove wire segments in the mesh in order to obtain the desired independent and isolated electrical paths.

The mesh may be attached to a piece of polyethylene, such as a pipe coupling, for melting and fusing together polyethylene parts. When it is desired to join two or more polyethylene parts together, the appropriate prepared pipe coupling is selected. The pipe covering is installed over the parts, and an electrical current is applied to the electrical paths running through the woven mesh heater. As a result, the woven mesh heater heats the polyethylene members to a desired temperature to optimally fuse the members together. The heater heats the polyethylene members uniformly and does not overheat due to its Curie-point control.

The present invention also provides for and can be conceptualized as a method for creating a heater which uniformly generates heat across a surface upon electrical excitation. The method comprises the following steps: forming a mesh having first wires transverse to second wires, the mesh having crossover points between the first and second wires, the first wires having insulation, the wires having a heat-generating resistance means; and depleting insulation from the first wires at a plurality of the crossover points; bonding together the first and second wires at the plurality of the crossover points; and creating the electrical path with intermittent segments of the first and second wires.

In addition to accomplishing all of the objects as set forth above, the present invention has many other desirable advantages, a few of which are indicated hereafter.

Art advantage of the heater of the present invention is that it is simple in design, inexpensive and easy to manufacture, and reliable in operation.

Another advantage of the heater of the present invention is that it is durable in structure and can be readily used on site.

Another advantage of the heater of the present invention is that when the two-layer laminate is utilized as the heat-generating resistance means in the mesh, the heater is self-regulating in that it will maintain a constant temperature provided that energization is constant.

Other objects, features, and advantages of the present invention will become apparent to one with skill in the art upon examination of the drawings and the detailed description.

BRIEF DESCRIPTION OF THE DRAWINGS

The present invention can be better understood with reference to the following drawings. The drawings are not necessarily to scale, emphasis instead being placed upon clearly illustrating principles of the present invention.

FIG. 5A is a top perspective view illustrating a polyethylene pipe coupling having the specific woven mesh heater of FIG. 4 disposed therein.

FIG. 5B is a bottom perspective view of the pipe coupling of FIG. 5A taken along line 5B'—5B'.

FIG. 6 is a perspective view of the pipe coupling of FIG. 5B which has been implemented to connect two separate pipes.

FIG. 7 is a schematic circuit diagram illustrating the novel heater connected to an electrical power source.

DETAILED DESCRIPTION OF THE PREFERRED EMBODIMENT

Figure 2:
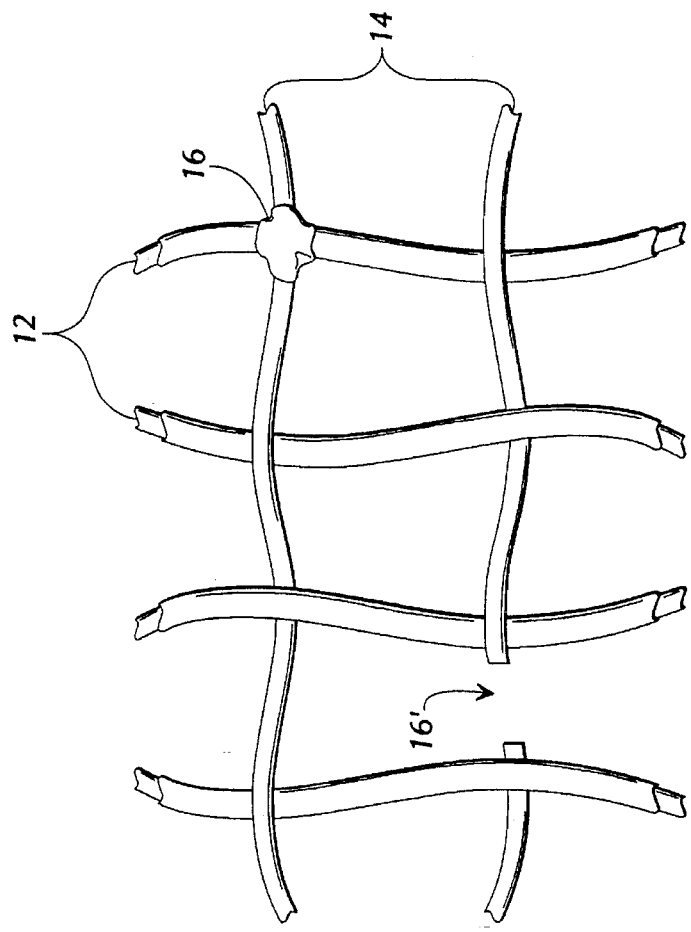
FIG. 2 is an enlarged partial perspective view of the woven mesh heater of FIG. 1.
Figure 1:
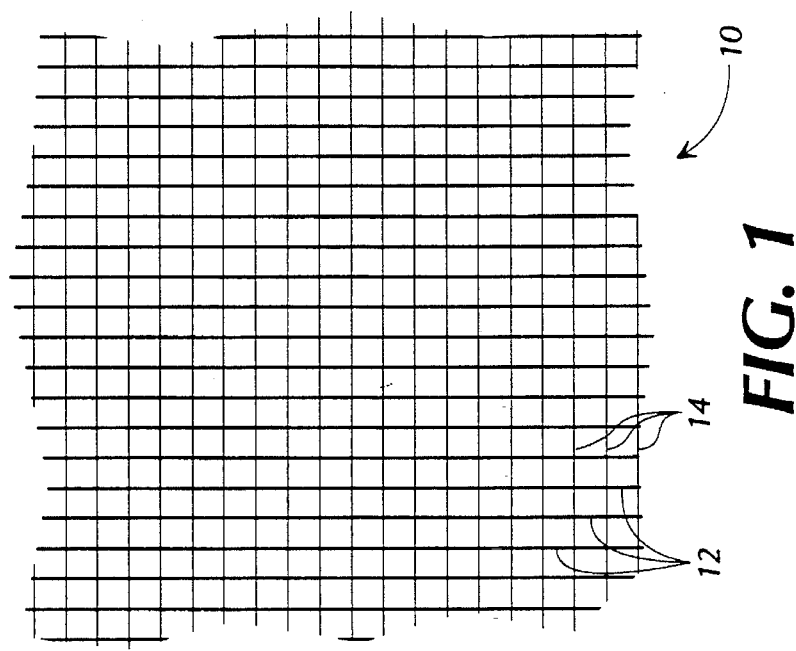
FIG. 1 is a top plan view illustrating a novel woven mesh heater of the present invention.

Referring now to the drawings wherein like reference numerals designate corresponding parts throughout the several views, a novel woven mesh heater 10 in accordance with the present invention is shown in FIGS. 1 and 2. The woven mesh heater 10 of FIGS. 1 and 2 can be formed with virtually any two dimensional configuration and periphery and essentially provides a uniform heat emitting surface. The woven mesh heater 10 is particularly useful in fusing together polyethylene pieces, such as pipes, as will be further described in detail hereinafter.

In structure, the woven mesh heater 10 preferably comprises a plurality of insulated first wires 12 interleaved with and situated transversely to a plurality of noninsulated second wires 14. In the preferred embodiment, the first wires are insulated conductive wires, whereas the second wires 14 are noninsulated heat-generating resistive wires for producing heat upon electrical excitation. In another embodiment of the mesh heater 10, the first wires are insulated heat-generating resistive wires, whereas the second wires 14 are noninsulated conductive wires. In still another embodiment, both the insulated first wires and noninsulated second wires 12, 14 are heat-generating resistive wires. In yet another embodiment, both the insulated first wires 12 and the noninsulated second wires 14 include one or more heat-generating resistive wires and one or more conductive wires. In general, use of entirely heat-generating wires for the first and second wires 12, 14 would be optimal from a performance vantage point, but undesirable from the standpoint of expense. Conductive wire is generally less expensive than heat-generating resistive wire, and therefore, use of conductive wire in the implementation reduces cost. The discussion hereafter refers to the preferred embodiment, wherein the first wires are insulated conductive wires, and the second wires 14 are heat-generating resistive wires. However, the principles and discussion are equally applicable to the foregoing alternative embodiments.

In the preferred embodiment, the conductive wires 12 and the resistive wires 14 are situated generally orthogonally, or perpendicular, relative to each other and are woven together in an interleaved mesh-like manner, as illustrated in FIG. 2. In a sense, each of the wires 12, 14 overlap each other alternately within the woven mesh heater 10. The mesh-like network in the heater 10 is created using any of the many known techniques in the industry.

The conductive wires 12 are coated with any of a variety of conventional insulations. However, preferably, the conductive wires 12 are an insulated copper wire or an anodized aluminum wire. Moreover, the wire can be coated or extruded with the insulation, as is well known in the art. Teflon insulation or any high temperature insulation is ideal and preferred, but not required.

Resistive wires 14 are generally any type of wire which can generate heat upon electrical energization and which can be suited to the configuration and functionality as described in detail herein. However, preferably, resistive wires 14 have a two-layer laminate configuration as taught by U.S. Pat. No. 4,256,945 to Carter et al., which patent is incorporated herein by reference as if set forth in full hereinbelow. The outer surface layer of the two-layer laminate configuration is a high resistivity ferromagnetic material and the underlying inner core is a relatively thick, non-magnetic material having a low resistivity and a large conductive area. The two-layer laminate configuration exhibits a particular Curie temperature (which is determined by the Curie temperature of the outer ferromagnetic surface layer) and functions as a temperature self-regulating heater when a high frequency electrical current is applied thereto. More specifically, as the temperature of the wire gets close to the Curie temperature, the current migrates from the surface layer to the core and there is an overall decrease in resistivity. This effect causes a very large decrease in the heater resistance. Because there is a constant current applied to the wire, the power to the heater 10 decreases as the resistance decreases. Thus, the heater formed by the wire is self-regulating at a particular Curie temperature.

One or more, but preferably a plurality, of electrical paths are configured within and through the woven mesh heater 10 of FIGS. 1 and 2 for receiving electrical power for the purpose of generating and emanating heat. The electrical paths are formed by depleting insulation from the conductive wires 12 at a plurality of crossover points and by bonding together the conductive and resistive wires 12, 14 at the plurality of crossover points. This can be accomplished by using a conventional resistance spot welding machine or other like mechanism for accomplishing the same purpose. Each of the electrical paths have first and second ends for receiving the electrical energy. Between these ends are intermittent segments of the resistive and conductive wires 12, 14. The intermittent segments are interfaced by interconnects between respective regions of the resistive and conductive wires 12, 14.

The number of electrical paths 22 which are implemented depends upon the desired application and, in large part, on the spatial configuration of the heater 10. The orientation of the electrical paths 22 can facilitate uniform heating by distributing the paths throughout the area of the structure. However, adding additional paths does not directly increase the temperature, as the two-layer laminate resistive wires 14 insure that the temperature remains steady-state, provided there is constant energization.

In the preferred embodiment, the interconnects between the segments of the conductive and resistive wires 12, 14 are formed by a spot welding process. Welds 16, as shown in FIG. 2, are created at intersection points of the wires 12, 14, after the mesh-like configuration in the woven mesh heater 10 is produced. However, needless to say, other suitable methods may be employed for depleting insulation from the conductive wires 12 and for in turn bonding the wires 12, 14 together. Furthermore, it may be necessary to also remove some wire segments in order to obtain mutually exclusive electrical paths 22, as is indicated in FIG. 2 at reference numeral 16'. However, many implementations of the paths 22 do not require absent wire segments 16'.

Figure 4:
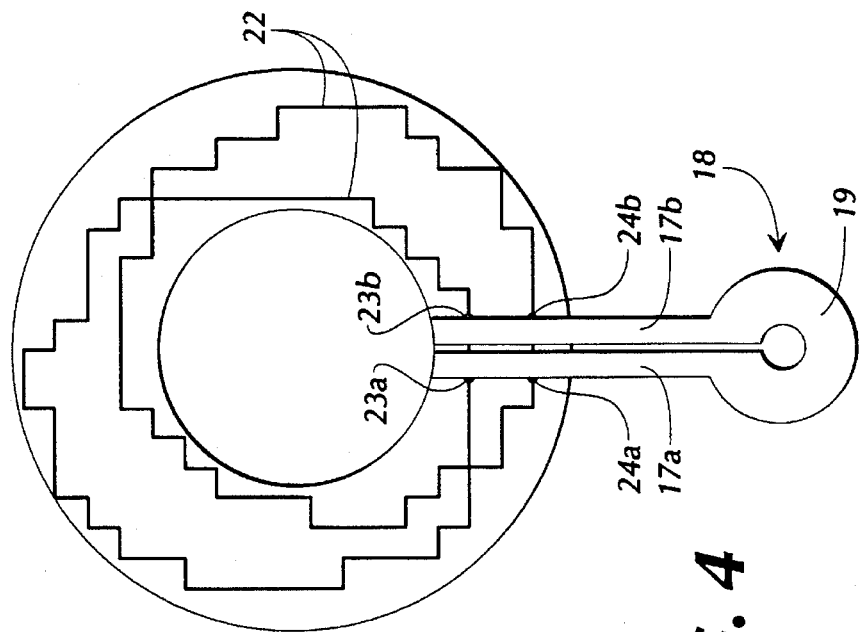
FIG. 4 is a top schematic view of the specific woven mesh heater of FIG. 3 illustrating the electrical paths formed within and through the respective mesh.
Figure 3:
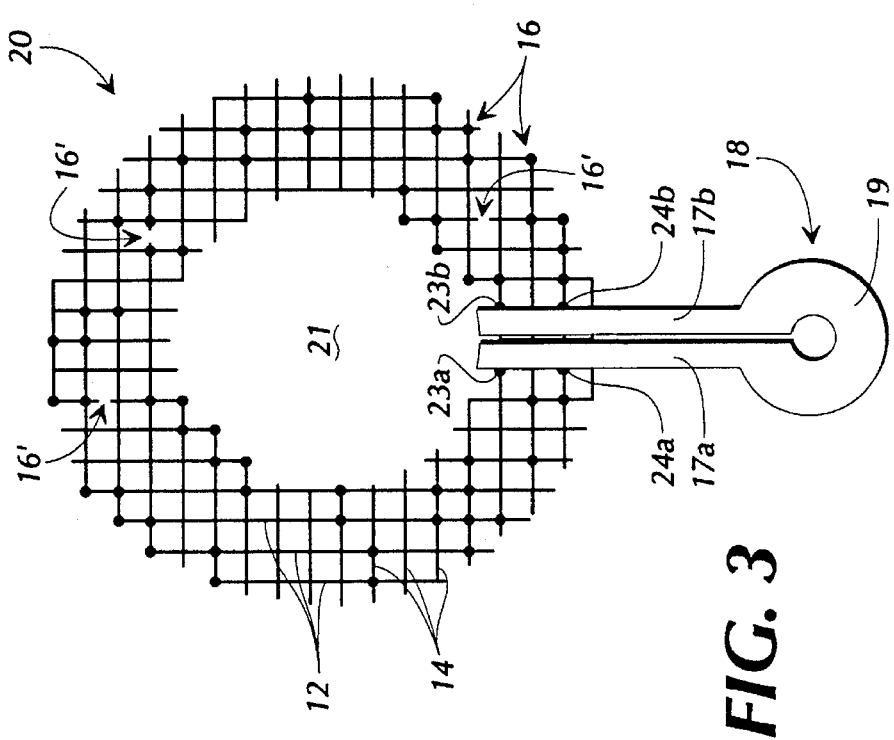
FIG. 3 is a top plan view of a specific woven mesh heater of the present invention, which is a specific implementation of the woven mesh heater of FIG. 1.

For purposes of discussion and for a better understanding of the principles of the present invention, FIGS. 3 and 4 illustrate a specific embodiment of the woven mesh heater 10. FIGS. 3 and 4 show a woven mesh heater 20 which can be utilized to attach one polyethylene pipe to another polyethylene pipe. As shown, the woven mesh heater 20 comprises a loop, or O-like, configuration of the interleaved mesh of the conductive and resistive wires 12, 14. The loop configuration has an aperture 21. The woven mesh heater 20 comprises a plurality of electrical paths 22, two are shown as an example, which pass through the interleaved mesh and which are formed from the welds 16 and absent wire segments 16' throughout the woven mesh heater 20. Each of the electrical paths 22 starts at a sheet-like, first electrode 17a of an energizing portion 18 and ends at a sheet-like, second electrode 17b of the energizing portion 18. The first and second electrodes 17a, 17b are connected to the electrical paths 22 via any bonding process, but is preferably connected via respective welds 23a, 24a and 23b, 24b, shown in FIGS. 3 and 4. The first and second electrodes 17a, 17b are connected together via a sheet-like eye loop 19. The energizing portion 18, and specifically the eye loop 19, receives electrical energy so that the woven mesh heater 20 generates heat energy, as will be further described in detail hereafter.

Because of the unique methodology of construction, the electrical paths 22 may be overlapping, as shown in FIG. 4, or nonoverlapping. However, the electrical paths 22 are electrically parallel. Moreover, the electrical paths 22 should be of substantially the same length so that each exhibits generally the same resistance. This disposition ensures that when the electrical paths 22 are energized, the current flow though each path 22 is about the same and, consequently, each electrical path 22 radiates approximately the same heat per unit of length. If these electrical paths are not substantially the same length, then an undesirable nonuniform spatial distribution of heat will be generated throughout the area of the woven mesh heater 20. This is especially important when using wires with Curie-point self-regulation, as in the preferred embodiment. When one path of the heater 20 of the preferred embodiment reaches its Curie point, and its resistance drops, it will tend to steal current from other paths and experience thermal runaway. Thus, if various paths are not initially similar in resistance, then the lowest resistance path will start with the highest current, will regulate, will drop in resistance, will steal more current, and then overheat.

After the desired electrical paths 22 are formed in the woven mesh heater 20, the woven mesh heater 20 is cut, preferably by a stamping process, and then insert molded, or otherwise disposed, in a polyethylene mold to form a pipe coupler 26, as shown in FIGS. 5A and 5B. The woven mesh heater 20 can be cut in a variety of shapes and disposed in a variety of molds, depending upon the particular configuration of polyethylene parts which are to be joined. In structure, the pipe coupler 26 comprises an arcuate planar member 28 with an aperture 31 and a cylindrical pipe member 32 extending outwardly from the aperture 31 in the arcuate planar member 28. The woven mesh heater 20 is disposed at the underside, or the concave side, of the arcuate planar member 28 so that the aperture 21 of the heater 20 is coextensive and in line with the aperture 31 in the arcuate planar member 28. The coupler 26 is preferably a single unitary piece of polyethylene manufactured in accordance with well known techniques in the art.

The arcuate planar member 28 is adapted to be placed in contact with a polyethylene cylindrical pipe, which is to be tapped into, as is illustrated in FIG. 6. With reference to FIG. 6, the arcuate planar member 28 is positioned over a hole 34, shown by phantom lines, produced in a polyethylene cylindrical pipe 36 to be tapped. Further, the cylindrical pipe member 28 is adapted to receive within its central part another polyethylene cylindrical pipe 38 to be connected to the pipe 36. The pipe 38 extends through the cylindrical pipe member 28, through the aperture 31 in the arcuate planar member 28, through the hole 34 in the pipe 36, and slightly into the interior region 42 of the pipe 36.

After the pipe coupler 26 is disposed in the configuration shown in FIG. 6, the energizing portion 18 is connected to a power source for causing the configuration to be bonded together. FIG. 7 shows an electrical circuit schematic 44 illustrating energization of the woven mesh heater 20. Referring to FIG. 7, the electrical paths 22 within the woven mesh heater 20 can be represented as parallel resistances $R_0$ and $R_1$, where $R_0$ preferably equals $R_1$ so that uniform heat is propagated from both. A power source 46 is interfaced to the energizing portion 18 of the heater 20 via magnetic coupling, or via a transformer configuration. The magnetic coupling insures that no sparks occur during energization of the woven mesh heater 20. A primary coil 48 is associated with and energized by the power source 46. The primary coil 48 is positioned in close proximity with the eye loop 19 of the energizing portion 18. A magnetic core of ferromagnetic or ferrimagnetic material can pass through the center hole in the eye loop 19, thus optimizing the magnetic coupling. The eye loop 19 serves as the secondary coil of the transformer configuration. In the preferred embodiment, the power source 46 provides an alternating current (AC) to the woven mesh heater 20 via the transformer configuration. Moreover, when the resistive wires 14 are the two-layer laminate configuration as taught by U.S. Pat. No. 4,256,945, the electrical signal supplied to the woven mesh heater 20 is set at about 450 kilohertz (KHz), which yields optimum performance. As a result of the current, the woven mesh heater 20 melts the polyethylene and causes fusion of the polyethylene pieces 26, 36, 38.

It is obvious to those skilled in the art that many modifications may be made to the preferred embodiment of the present invention, as set forth above, without departing substantially from the principles of the present invention. All such modifications are intended to be included herein within the scope of the present invention, as defined in the following claims.

Wherefore, the following is claimed:

1. A heater having a uniform heat emitting surface, comprising:

a woven mesh having interleaved first and second wires forming a grid with said first wires aligned in a first direction and with said second wires aligned in a second direction, said first direction being transverse to said second direction, said first and second wires for conducting electricity, said first wires being insulated, said second wires being noninsulated; and an electrical path passing through said mesh, said path comprising first and second ends for receiving said electricity, said path comprising intermittent segments of said first and second wires, said intermittent segments being interfaced by interconnects between crossover regions of said first and second wires, said path for generating heat upon energization by said electricity.

2. The heater of claim 1, further comprising another electrical path passing through said mesh comprising intermittent segments of said first and second wires interfaced by interconnects between crossover regions of said first and second wires, said paths exhibiting equal electrical resistance.

3. The heater of claim 1, wherein said first wires are conductive wires and said second wires are resistive wires, said resistive wires for generating heat upon excitation by said electrical energy.

4. The heater of claim 1, wherein said interconnects are welds.

5. The heater of claim 1, further comprising a means for applying said electrical energy to said electrical paths.

6. The heater of claim 1, wherein said first and second wires are disposed substantially orthogonal to each other.

7. The heater of claim 1, wherein segments of wires comprising said mesh have been removed to form said electrical path.

8. The heater of claim 2, wherein said electrical paths are electrically parallel.

9. The heater of claim 2, wherein said electrical paths are overlapping without electrical contact.

10. The heater of claim 2, wherein said electrical paths are equidistant between said first and second ends respectively.

11. The heater of claim 2, wherein said electrical paths are mutually exclusive electrical paths.

12. The heater of claim 3, wherein said resistive wires have an inner core of a non-magnetic material and an outer surface layer of a ferromagnetic material.

13. The heater of claim 12, wherein said conductive wires comprise copper.

14. A method for creating a heater having a uniform heat emitting surface, comprising the steps of:

forming a mesh having insulated first wires interleaved with and situated transverse to noninsulated second wires, said mesh having crossover points between said first and second wires;

providing a heat-generating resistance means within said wires; and forming an electrical path comprising segments of said first and second wires and passing through said mesh by depleting insulation of said first wires at a plurality of said crossover points and by bonding together said second and first wires at said plurality of said crossover points.

15. The method of claim 14, further comprising the step of forming a plurality of electrical paths passing through said mesh by depleting said insulation of said first wires at a plurality of crossover points and by bonding together said second and first wires at said plurality of said crossover points.

16. The method of claim 14, further comprising the step of welding together said first and second wires at said crossover points.

17. The method of claim 14, further comprising the step of applying electrical energy to said electrical paths.

18. The method of claim 14, wherein said first wires are conductive wires and said second wires are resistive wires.

19. The method of claim 15, further comprising the step of forming said electrical paths to be independent of each other.

20. The method of claim 15, further comprising the step of removing a wire segment from said mesh while forming said plurality of said electrical paths.

21. The method of claim 15, further comprising the step of forming said paths with respective first and second ends for receiving electrical energy.

22. The method of claim 15, further comprising the step of forming said electrical paths so that an overlap exists between a pair of said paths without electrically connecting said paths at said overlap.

23. The method of claim 15, further comprising the step of forming said electrical paths with respective first and second ends so that all of said paths are equidistant between said first and second ends.

24. A method for creating a heater which uniformly generates heat across a surface upon electrical excitation, comprising the steps of:

forming a mesh having insulated first wires transverse to noninsulated second wires, said mesh having crossover points between said first and second wires, said wires comprising a heat-generating resistive wire; and depleting insulation from said first wires at a plurality of said crossover points;

bonding together said first and second wires at said plurality of said crossover points; and creating a heat-generating electrical path with intermittent segments of said first and second wires.

25. A method for forming a heater having a uniform heat emitting surface for fusing polyethylene pieces, comprising the steps of:

forming a mesh from insulated first wires and noninsulated second wires, said first wires being disposed transverse to said second wires so that said mesh has crossover points of said first and second wires, said wires for generating heat upon excitation by electrical energy; and forming a plurality of electrical paths of equal length and electrical resistance through said mesh with segments of said first and second wires by depleting said insulation from said conductive wires at a plurality of said crossover points so that said second wires and said first wires are adhered together and electrically connected at said plurality of said crossover points.

26. The method of claim 25, further comprising the steps of concurrently energizing said electrical paths and fusing together polyethylene pieces.

27. The method of claim 25, further comprising the step of energizing said electrical paths with an alternating electrical current at approximately 450 KHz.

28. The method of claim 25, further comprising the step of eliminating a wire segment from said mesh while forming said plurality of said electrical paths.

29. A method for using a heater created in accordance with the method of any of claims 14, 24 and 25, comprising the step of:

disposing said mesh in a polyethylene piece; and electrically energizing said electrical paths.

30. The method of claim 29, and further comprising the step of electrically interfacing said paths with a power source via magnetic coupling.

31. The method of claim 25, wherein said first wires are conductive wires and said second wires are resistive wires.

* * * * *